United States Patent
Laursen et al.

(10) Patent No.: US 7,984,028 B2
(45) Date of Patent: Jul. 19, 2011

(54) SYSTEM AND METHOD FOR APPLICATION OF HASH FUNCTION IN TELECOMMUNICATION AND NETWORKING

(75) Inventors: Soeren Laursen, Allerod (DK); Hartvig Ekner, Holte (DK)

(73) Assignee: Applied Micro Circuits Corporation, San Diego, CA (US)

( * ) Notice: Subject to any disclaimer, the term of this patent is extended or adjusted under 35 U.S.C. 154(b) by 606 days.

(21) Appl. No.: 12/124,225

(22) Filed: May 21, 2008

(65) Prior Publication Data

US 2009/0292721 A1 Nov. 26, 2009

(51) Int. Cl.
*G06F 17/00* (2006.01)
(52) U.S. Cl. ...................................................... 707/698
(58) Field of Classification Search .................. 707/609, 707/687, 698, 705, 736, 747, 821, E17.036, 707/E17.052
See application file for complete search history.

(56) References Cited

U.S. PATENT DOCUMENTS

| | | | |
|---|---|---|---|
| 6,889,225 B2 | 5/2005 | Cheng et al. | |
| 6,917,934 B2 | 7/2005 | Cheng et al. | |
| 7,107,258 B2 | 9/2006 | Cheng et al. | |
| 7,822,927 B1 * | 10/2010 | Scheer | 711/133 |
| 2006/0143168 A1 * | 6/2006 | Rossmann | 707/4 |

OTHER PUBLICATIONS

Cesarini et al, Single Access Hashing With Overflow Separators for Dynamic Files, Bit 33 (1993) pp. 15-28.*
Vandierendonck et al, XOR-Based Hash Functions, IEEE Transactions on Computers, vol. 54, No. 7, Jul. 2005, pp. 800-812.*

* cited by examiner

*Primary Examiner* — Fred I Ehichioya
(74) *Attorney, Agent, or Firm* — Law Office of Gerald Maliszewski; Gerald Maliszewski

(57) ABSTRACT

A novel hashing function and hashing collision resolution method are introduced that combine multiple known hashing resolution methods to achieve a very low collision probability that is specifically useful in lookup of long keys, such as (for example) the VLAN and MAC lookup in Ethernet switches. However, the system and method introduced here can be used in any networking and telecommunication systems.

10 Claims, 11 Drawing Sheets

H0_SEL_TBL [ ]      H0_TBL [ ]

H1_SEL_TBL [ ]      H1_TBL [ ]

H2_TBL [ ]

FIG 1

H0_SEL_TBL [ ]   H0_TBL [ ]

H1_SEL_TBL [ ]   H1_TBL [ ]

H2_TBL [ ]

FIG 3

| Key Number | Double VLAN lookup |
|---|---|
| No. of Mappings/Relations | 64K |
| No. of Index entries | 960K |
| Probability of collision at 100% relations | $< 2.9 * 10^{-7}$ |
| Probability of collision at 80% relations | $< 5.0 * 10^{-11}$ |

FIG. 8

SYSTEM AND METHOD FOR APPLICATION OF HASH FUNCTION IN TELECOMMUNICATION AND NETWORKING

BACKGROUND OF THE INVENTION

Hashing is a well-known method in the computer industry, by which large number values (called Keys and denoted by "K") are compressed (Hashed) to smaller number values (called hashed numbers and denoted by "h"), in order to make it practical to use it as index for lookup tables. Using the key "K" directly as a lookup table index, without Hashing, requires a very large memory of size 2^n (2 to the power n, where n is the size of K in number of bits), which may have very little data scattered in it. Hashing will basically optimize the memory size requirements when large number values are to be used for indexing.

A well-known problem in Hashing is called "Collision". Collision happens when two or more Keys (K) are hashed to the same small Hashed value (h). Collision is possible because the mapping from the Keys to Hashed values is not a 1:1 relationship, rather, it is an N:1 relationship, in which many (N) Keys can map the same Hashed value (h).

There are also numerous Hashing functions that are used to convert Keys (K) to Hashed values (h). The ideal Hashing functions are those that are more random and have less correlation between Keys (K) and Hashed values (h). There are also numerous methods in the industry to resolve hashing collisions, which include, but are not limited to:
  Chaining
  Overflow areas
  Re-hashing
  Using neighboring slots (linear probing)
  Quadratic probing
  Random probing.

This invention uses unique Hashing functions and Hashing collision mechanisms that are novel. The main purpose of this invention is, for example, for Ethernet MAC address lookup and double VLAN tag lookups, but it can be used for other lookup purposes, as well.

SUMMARY OF THE INVENTION

This invention consists of unique hashing functions, as well as a novel hashing collision resolution method. The collision resolution method consists of populating the hash lookup tables, while doing the collision resolution.

The invention uses multiple hashing functions (example 3), to create multiple hashing tables. Starting for the first hash function, we do not do the lookup (i.e. do not have to read, to speed up the process), because a flag tells us if we have to go to the next hash function.

For the first function overflow, we try the overflow flag, and if that flag is zero, then we go to the next hash function, and repeat this process again and again.

Each hashing table entry consists of multiple index values (example 3). In order to select the candidate index, a matching of a 2-bit extract of the Key is done against the stored extracts corresponding to each of those indexes. The candidate index goes through a final check, by doing a reverse lookup from Index to Key on a table that has stored the key.

Given 3 distinct keys, it is always possible to choose 2 bit positions that result in 3 distinct extracts. So, in each entry in H0_TBL, H1_TBL etc., the selected two-bit positions are stored, as are the resulting extracts, one for each candidate index. This allows the correct candidate index, and thus, the correct candidate record, to be selected, without having to actually inspect the keys in all 3 records.

BRIEF DESCRIPTION OF THE DRAWINGS

FIGS. 1-7 show the sequence of hash table and hash select table fill-outs for a VLAN and MAC lookup example.

FIG. 8 shows an example of relationship between number of mappings, number of index entries, and the probability of collision.

DETAILED DESCRIPTION OF THE PREFERRED EMBODIMENTS

Figure 2:

This invention comprises of two sets of functions/methods:
  Hashing functions
  Hashing collision resolution method Hashing function: There are 6 hashing functions used in this invention. The hash Key (K) is of length "N". When a hash key has a shorter length than "N", then it is extended to length N by appending enough zeros to it. Two actual implementations are described below:

Implementation 1 (Double VLAN tag lookup in Ethernet): In this implementation, the hash key contains 37 non-zero bits that are zero, extended to 54 bits, when used in the hash function calculations. The bits in the key are:
  key [53:37]=All 0
  key [36:0]=rxVirtPort
  key [23:12]=VlanId
  key [11:0]=0 or inner VLAN ID depending on lookup type The first sets of hash functions for this invention are:
  VLAN_H0 (key)=(key [44:30] RoL 10)^(key [29:15] RoL 10)^key [14:0]
  VLAN_H1 (key)=(key [44:30] RoL 12)^(key [29:15] RoL 11)^key [14:0]
  VLAN_H2 (key)=(key[53:36] RoL 0)^(key[35:18] RoL 0)^key [17:0]

In the above expressions, bit extraction from an expression is shown with [left: right]. E.g. if exp1 is 5 then exp1 [2:1] is 2. The symbol "^" above represents XOR function.

The symbol "RoL" represents the Rotate-Left (RoL) function. A Rotate-Left (RoL) function does a bit-wise rotate left for a number of bits. The result is thereby a value with the same number of bits. E.g. if (0x1234 RoL 4)=0x2341, and (0x1234 RoL 12)=0x4123.

Implementation 2 (L2 MAC address lookup in Ethernet): In this implementation the hash key contains 61 non-zero bits that are zero extended to 72 bits, when used in the hash function calculations. The bits in the Key are:
  Key [71:61]=All 0
  Key [60:48]=Vsi
  Key [47:0]=MAC address, either SMAC or DMAC The hash functions are:
  L2_H0 (Key)=(Key [63:48] RoL 7)^(Key[47:32] RoL 0)^(Key[31:16] RoL 0)^Key[15:0]
  L2_H1 (Key)=(Key [63:48] RoL 10)^(Key [47:32] RoL 2)^(Key [31:16] RoL 1)^Key [15:0]
  L2_H2 (Key)=(Key [71:54] RoL 0)^(Key[53:36] RoL 0)^(Key[35:18] RoL 0)^Key[17:0]

Hashing collision resolution method: Any hashing would naturally map many keys to the same hashed number. This is called collision. This invention uses a unique method for collision resolution, which consists of combining 3 methods, namely Chaining, Overflowing and re-hashing.

The collision resolution method consists of populating the hash lookup tables, while doing the collision resolution.

The invention uses multiple hashing functions (example 3), to create multiple hashing tables. Starting for the first hash function, we do not do the lookup (i.e. do not have to read, to speed up the process), because a flag tells us if we have to go to the next hash function.

For the first function overflow, we try the overflow flag, and if that flag is zero, then we go to the next hash function, and repeat this process as needed. The second stage is to do a lookup of the keys, based on the state built in the $1^{st}$ stage.

Each hashing table entry consists of multiple index values (example 3). In order to select the candidate index, a matching of a 2-bit extract of the Key is done against the stored extracts corresponding to each of those indexes. The candidate index goes through a final check, by doing a reverse lookup from Index to Key on a table that has stored the key.

The purpose of the hash lookup is to find a unique index for a specific key. The mapping between key and index is configured in the main hash table called H0_TBL [ ] using the main hashing function called H0 (key). Each entry in the hash tables can hold three index values (corresponding to 3 key values that hash to the same hash number), and additional information is provided in the entry in order to pick one of the index values based on the key. This part of the algorithm is known as "chaining" method. When more than 3 keys map to the same hash value, a second hash table called H1_TB[ ] is used that has similar structure to the main hash table, in which there are also 3 index entries for each hash value, but use a different hashing function called H1(key). Note that the 3 corresponding index entries from previous table are remapped to 3 new entries in the new table. Similarly when more than 3 keys map to the same hash value in the 2nd table, a 3rd hash table called H2_TB[ ] is used that has similar structure to the main hash table, in which there are also 3 index entries for each hash value, but use a different hashing function called H2(key). This part of the algorithm is a combination of "overflowing" and "re-hashing" methods. This hierarchy can continue to as many tables as desired. However, statistical calculations show that with 3 hashing tables, the possibility of collision can be reduced to a negligible value.

Figure 1:
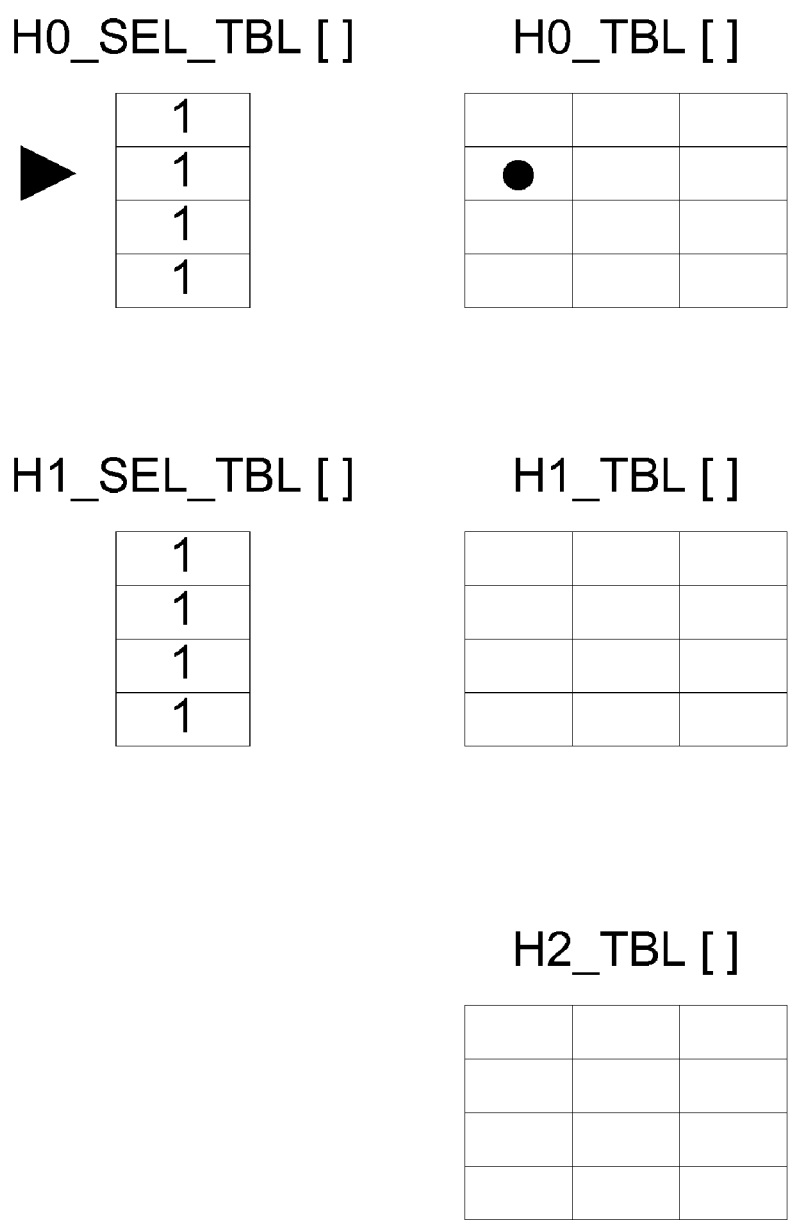

An example to illustrate the populating the hashing tables are illustrated in FIGS. 1 to 7. There are 3 hash tables in this example called H0_TBL [ ], H1_TBL [ ] and H2_TBL [ ], as well as 2 hash selection tables called H0_SEL_TBL [ ] and H1_SEL_TBL [ ] corresponding to hash tables H0_TBL [ ] and H1_TBL [ ] respectively.

The hash tables H0_TBL [ ], H1_TBL [ ] and H2_TBL [ ] hold the actual Key to Index mappings data, while the select tables, H0_SEL_TBL [ ] and H1_SEL_TBL [ ], indicate if the corresponding hash table is to be used, or if the relation is to be found in the next hash table. There is no select table for hash table H2_TBL [ ], since H2_TBL[ ] is the last table. The hash selection table has one bit entry for every row of its corresponding hash table. A value of "1" indicates that the corresponding row is valid and a value of "0" indicates that the lookup must be done on the next hash table.

Figure 3:
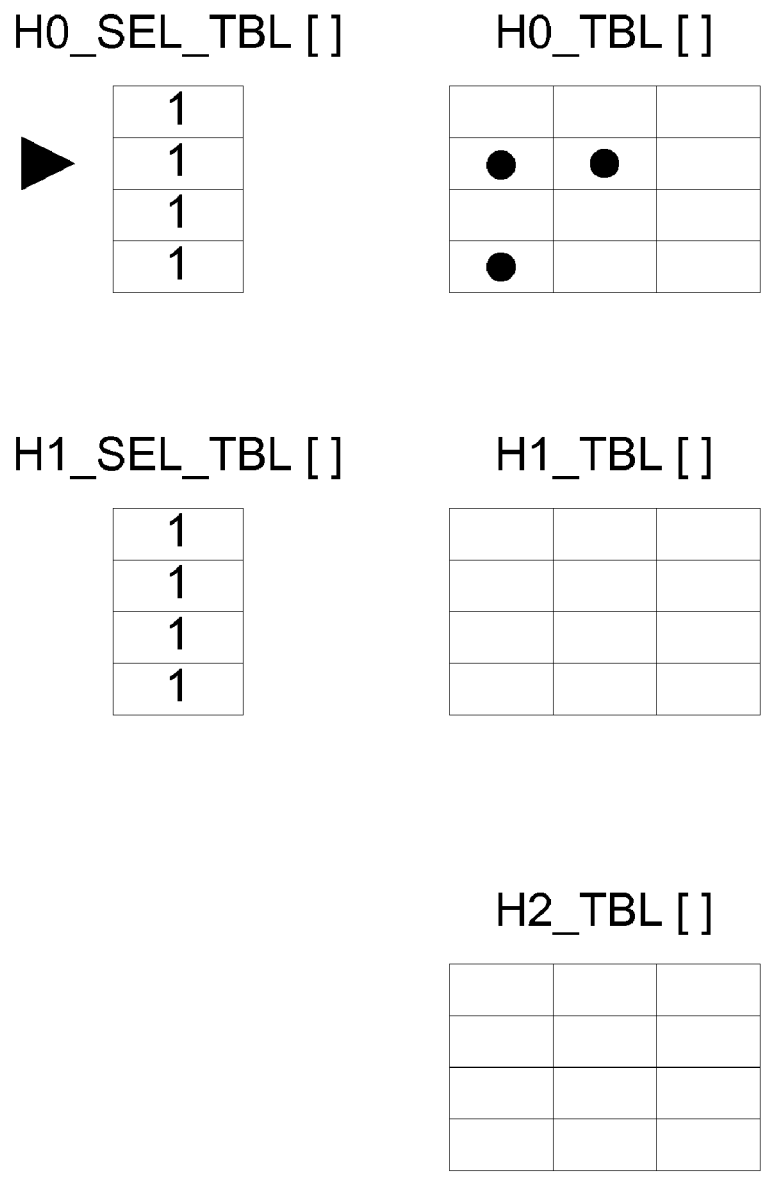
Figure 4:
Figure 5:
Figure 6:
Figure 7:

Seven key-to-index relations are inserted, starting with no relations in the tables. As illustrated in FIG. 1, the first relation is inserted into entry 2 of H0_TBL [ ], determined by hash function H0 (key), and takes the first of three free positions. As illustrated in FIG. 2, the next relation is inserted into entry 4, where it also takes the first free positions. As shown in FIG. 3, the third relation hits entry 2 again, taking the second position. As shown in FIG. 4, then another relation hits entry 2 again, whereby the last free position for entry 2 is taken. When the last relation hits entry 2 again, then there are no free positions in hash table H0_TBL [ ] entry. So as shown in FIG. 5, all four relations that hit the same entry in H0_TBL [ ] through hash function H0 (key) are redistributed to hash table H1_TBL [ ] using hash function H1 (key). The select table H0_SEL_TBL [ ] is then configured not to select hash table H0_TBL [ ] for entry 2 (this is done by setting the corresponding bit in H0_SEL_TBL [ ] to zero), since hash table H1_TBL [ ] is used, instead. FIG. 6 shows that only entry 2 of hash table H0_TBL [ ] is affected by the congestion, so new relations can still be inserted in hash table H0_TBL [ ], as long as they do not hit entry 2. FIG. 7 shows the final relation insertion that hits entry 2 of hash table H0_TBL [ ], and since the H0_SEL_TBL [ ] is zero for entry 2, it is inserted in hash table H1_TBL [ ].

The example shows that congestion in a hash table is handled by redistributing the entries in that table to the next hash table. Due to using different hash functions, the new distribution is likely to resolve the congestion. If, however, congestion in hash table H2_TBL [ ] occurs, then there is no resolution since there is no next level. In this case, it is not possible to insert the new relation. To limit the probability of such critical congestions, there are more hash table entries than the maximum number of key to index relations. The result is that the risk of critical congestion is very low. FIG. 8 shows the probability of collision for double VLAN lookup, using the 3 hash tables. Both simulations and practical uses have shown that the probability of collisions is sufficiently low.

Assuming there are N hash tables and N−1 select tables as explained above, in order to do a lookup of a certain key, first the key is hashed using first hash function and the hash value is used to do a lookup on the first hash select table. If the corresponding select bit is "1", the candidate index should be searched in the first hash table, otherwise, the index is not in the first hash table and a lookup must be done on the second hash select and hash tables, and this process continues until a candidate index is found.

Figure 9:
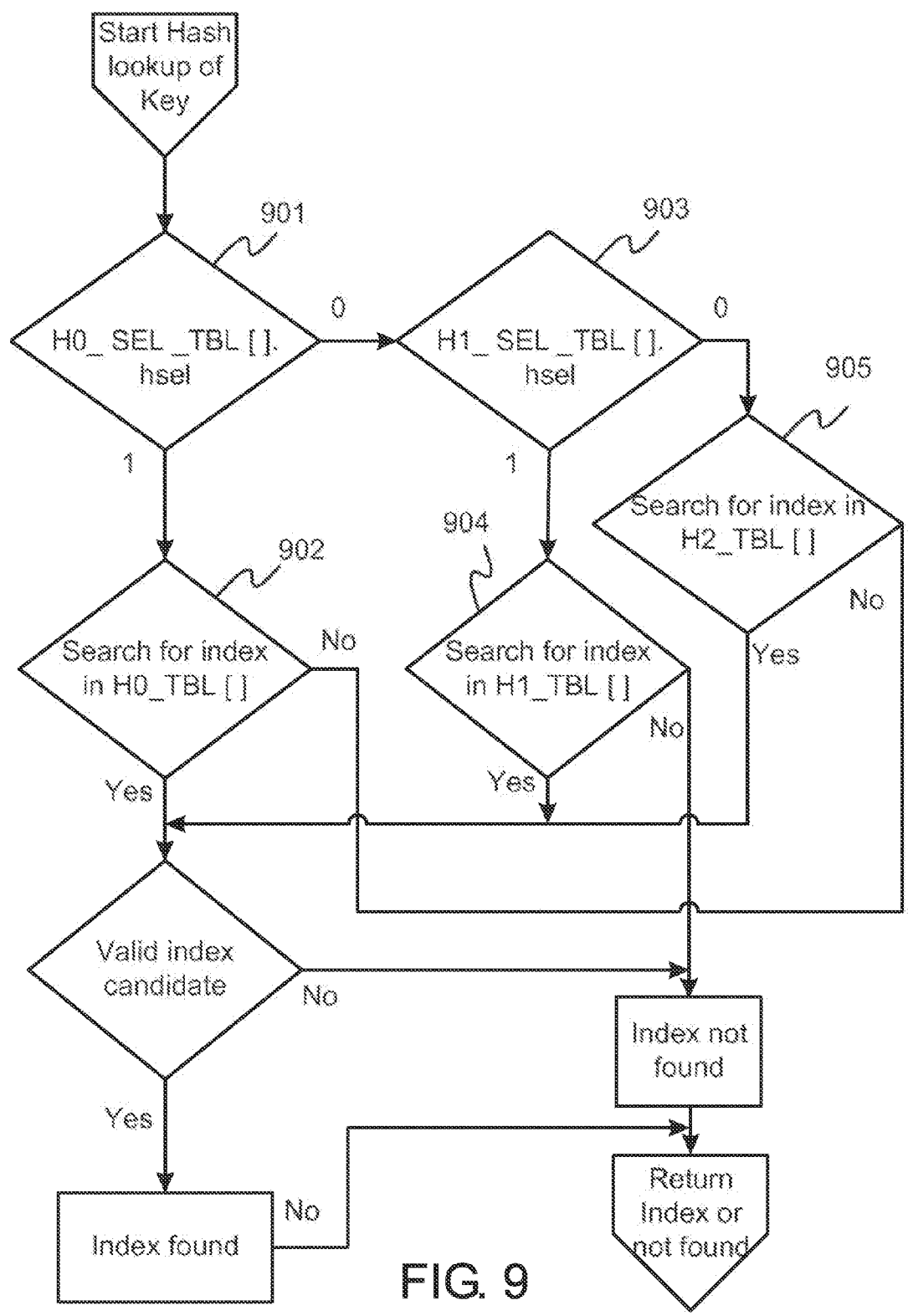
FIG. 9 is a data flow diagram of a hash lookup procedure.

FIG. 9 explains the collision resolution method via an example that uses 3 hash tables, with 3 different hash functions and 2 hash select tables. When lookup of a key is desired, the first step is to compute the hash value using the first hash function H0 (key). Then, this hash value is used as index to lookup the first hash select table H0_SEL_TBL [ ], as shown in Box 901. If the corresponding select bit is "1", this means that H0_TBL[ ] entry has not overflowed and that a candidate index must be sought here as shown in Box 902, otherwise, the lookup must be done on the next select table H1_SEL_TBL [ ], as per Box 903. Similarly, if the corresponding select bit is "1", this means that H0_TBL[ ] entry has not overflowed and that a candidate index must be sought here as shown in Box 904, otherwise, the lookup must be done on the next hash table H2_TBL [ ] as per Box 905. (Since hash table H2_TBL [ ] is the last hash table, there is no need for a corresponding hash select table.)

Each entry in the hash tables can hold three index values, and additional information is provided in the entry in order to pick one of the index values, based on the key.

Figure 10:
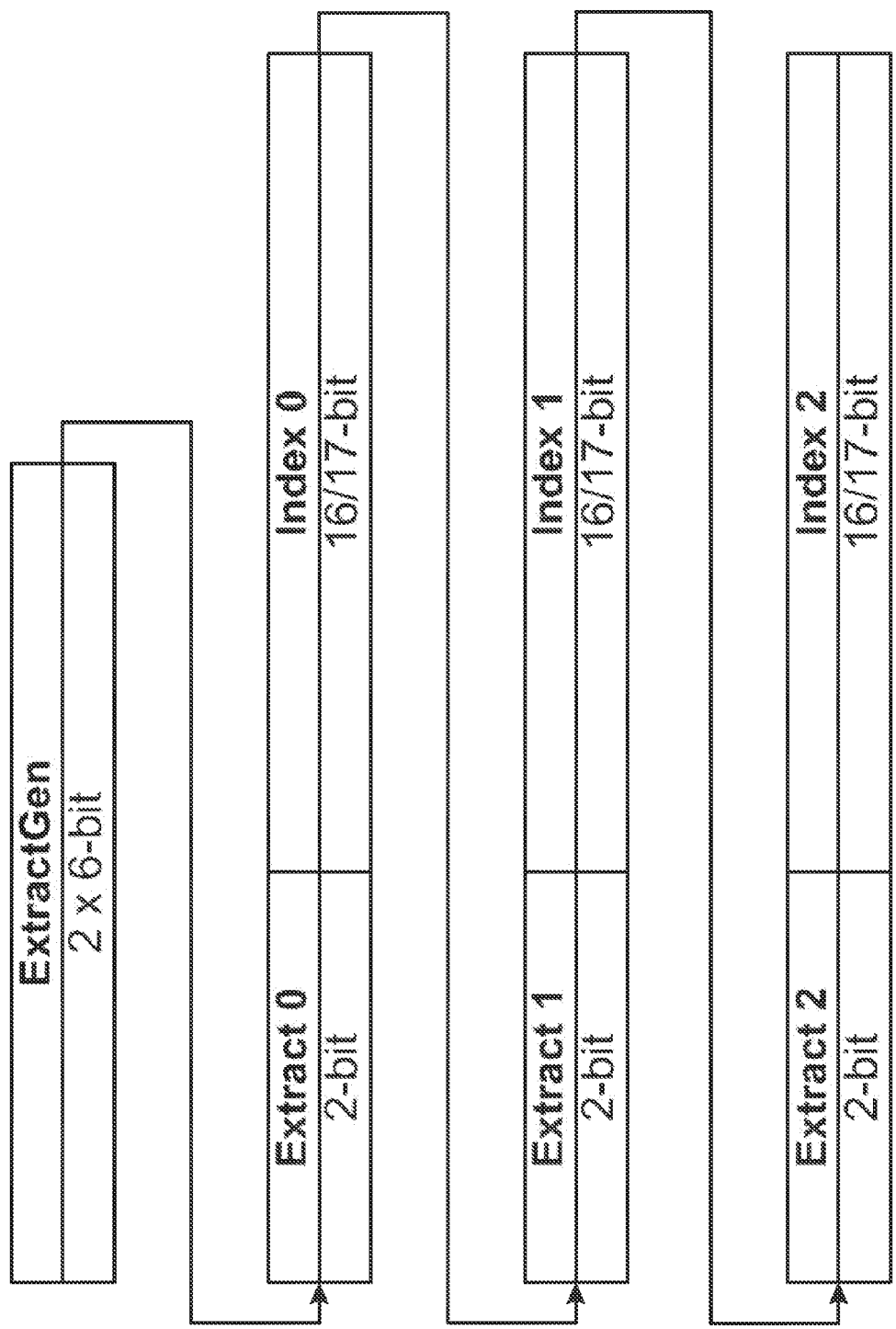
FIG. 10 shows the format of a hash table entry.

The hash tables, H0_TBL [ ], H1_TBL [ ] and H2_TBL [ ] each contain three index values per entry. The Key is used to differentiate the index values, and select only one of the indices. The format of a hash table entry is shown in FIG. 10, where the number of bits in the index depends on the lookup type. The procedure to pickup one of the 3 indexes stored in every hash table entry is as following.

Figure 11:
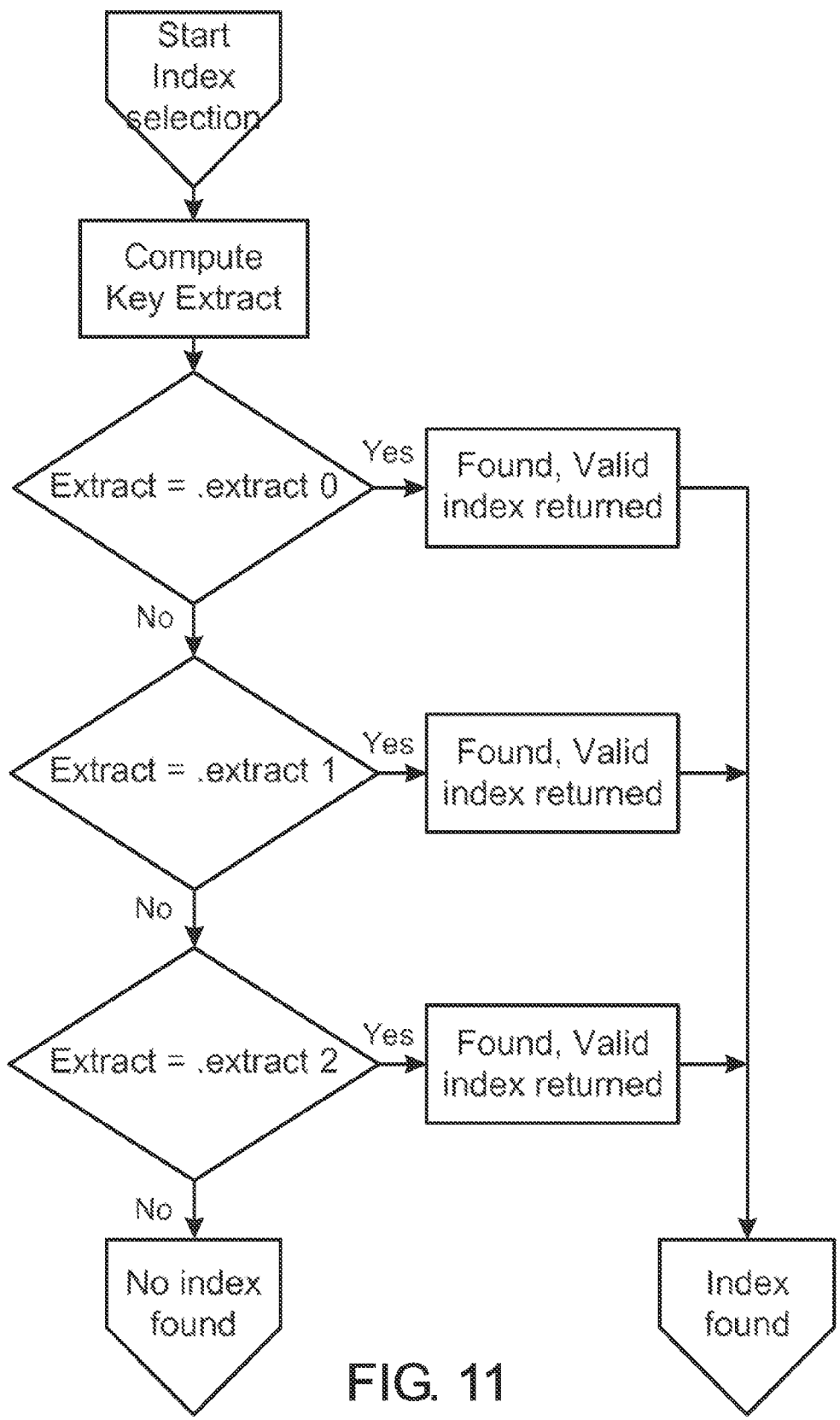
FIG. 11 is a flow chart that shows the process of selecting the candidate index among 3 indices from a hash table entry.

As can be seen from FIG. 10, there are 3 indexes in each row, and each index has a companion 2-bit Extract. The 2-bit extract is generated using the Extract Generator. We can choose the two bits from anywhere in the key. FIG. 11 shows the comparison between the Key extract and the 3 stored extracts.

In FIG. 11, Hn_TBL [ ].extract0, Hn_TBL [ ].extract1, and Hn_TBL [ ].extract2 are extracts of the keys for the different key to index relations. So, if key0 relates to .index0, key1 relates to .index1 and key2 relates to .index2, then:

.extract0=key0[.extractGen[11:6]] & key0[.extractGen[5:0]]

.extract1=key1[.extractGen[11:6]] & key1[.extractGen[5:0]]

.extract2=key2[.extractGen[11:6]] & key2[.extractGen[5:0]]

Hn_TBL [ ].extractGen must be selected so that the key extract values are different for valid index values. Such a value of Hn_TBL [ ].extractGen can always be selected, since all three key values for the index values are different.

Note that the symbol "&" denotes concatenation.

If a match is found, it is called the "candidate index", since a key for which no index is associated can also return a candidate index. The candidate index is therefore finally qualified, to ensure that the key for the candidate index matches the original key. The final qualification of candidate index is done by a reverse lookup from Index to Key is of a table that holds the Keys related to each Index. The reverse lookup ensures that the correct index is found.

Any variations of the above teaching are also intended to be covered by this patent application.

The invention claimed is:

1. A method of collision prevention or minimization for application of hash function in data transfer, data manipulation, telecommunication, verification, encryption, compression, or networking, said method, comprising:
  using multiple hash functions to create corresponding multiple hash tables, where each hash table includes entries for a plurality of indices in collision, each hash table formed by hashing a corresponding plurality of keys with a common hash function;
  hashing a first key with a first hash function;
  in response to hashing said first key with said first hash function, selecting an entry in a first selection table, cross-referenced to an entry in a first hash table;
  in response to an overflow-flag in said entry in said first selection table not being set, determining if a candidate index is sought in said first hash table as follows:
    generating a key extract for the first key;
    generating an index extract for said entry in said first selection table;
    comparing said ex extracts with said key extract; and,
    in response to determining a matching index extract, selecting the index associated with a snatching index extract as said candidate index;
  in response to said overflow-flag said entry in said first selection table being set, hashing said first key with a second hash function associated with a second hash table; and,
  determining if the candidate index is sought in said second hash table.

2. The method as recited in claim 1, wherein determining if the candidate index is sought in said second hash table includes:
  in response to hashing said first key with said second hash function, selecting an entry in a second selection table associated with said second hash table;
  in response to an overflow-flag in said entry in said second selection table not being set, determining if a candidate index is sought in said second hash table.

3. The method as recited in claim 2, the method further comprising:
  in response to said overflow-flag in, said entry in said second selection table being set, hashing said first key with a third hash function associated with a third hash table; and,
  determining if the candidate index is sought in said third hash table.

4. The method as recited in claim 1, further comprising:
  comparing a stored key associated with the candidate index to the first key; and,
  in response to matching the first key with the stored key, identifying a record associated with the stored key.

5. The method as recited in claim 1, wherein creating multiple hash tables includes using a chaining algorithm; and, wherein hashing said first key with said second hash action response to said overflow-flag in said entry in said first selection table being set includes using overflowing and re-hashing algorithms.

6. The method as recited in claim 1, wherein hashing said first key includes using XOR function.

7. A method for populating a plurality of overflowing index collision, hash tables, the method comprising:
  establish n hash tables, where each hash tables includes entries for in indices in collision, formed by hashing corresponding in keys with a common hash function, where n and m are integer variables;
  forming (n−1) selection tables, where each selection table is associated with a corresponding hash table, and each entry in a selection table is associated with the hash table entry of indices in collision;
  initially setting each selection table entry to an underflow value;
  hashing a first plurality of keys with a first hash function associated with a first hash table and a first selection table;
  prior to setting the first entry in the first selection table to the overflow value accepting a first key;
  hashing the first key with the first hash function;
  selecting the first entry in the first selection table
  seeking a first key candidate index in the first hash table;
  subsequent to seeking the first key candidate index in the first hash table, generating a key extract for the first key;
  generating index extracts for the first entry in the first table entry;
  matching an index extract with the key extract;
  selecting the index associated with the matching index extract as the candidate index;
  in response to filling a first hash table first entry with m indices in collision, setting the corresponding first entry in the first selection table to an overflow value;
  subsequent to setting the first selection table first entry to the overflow value, hashing a second plurality of keys associated with the first hash table entry, with a second hash function associated, with a second hash table and a second selection table;
  in response to filling a second hash table first entry with m indices in collision, setting the corresponding first entry in the second selection table to an overflow value;
  subsequent to setting the second selection table first entry to the overflow value, hashing a third plurality of keys associated with the second hash table entry, with an nth hash function associated with an nth hash table; and,
  generating indices to fill an entry in the nth hash table.

8. The method of claim 7 further comprising:
  subsequent to setting the first entry in the first selection table to the overflow value, selecting the first entry in the second selection table; and, prior to setting the first entry in the second selection table to the overflow value, seeking the first key candidate index in the second hash table.

9. The method of claim 8 further comprising:
subsequent to setting the first entry in the second selection table to the overflow value, seeking the first key candidate index in the nth hash table.

10. The method of claim 7 further comprising:
comparing a stored key, associated with the candidate index, the first key; and,
in response to matching the first key the stored key identifying a record associated with the stored key,

* * * * *

UNITED STATES PATENT AND TRADEMARK OFFICE
CERTIFICATE OF CORRECTION

PATENT NO. : 7,984,028 B2
APPLICATION NO. : 12/124225
DATED : July 19, 2011
INVENTOR(S) : Soeren Laursen It is certified that error appears in the above-identified patent and that said Letters Patent is hereby corrected as shown below:

In column 5, ln. 50 (claim 1), the word "index" has been incorrectly printed as --ex--.

In column 5, ln. 52 (claim 1), the word "matching" has been incorrectly printed as --snatching--.

In column 5, ln. 54 (claim 1), the word "in" has been omitted between the term "overflow-flag" and the word "said" (second occurrence).

In column 6, ln. 3 (claim 3), a "," has been incorrectly inserted between the word "in" (second occurrence) and the word "said" (second occurrence).

In column 6, ln. 16 (claim 5), the phrase "function in" has been incorrectly printed as --action--.

In column 6, ln. 25 (claim 7), the term "m" has been incorrectly printed as --in--.

In column 6, ln. 26 (claim 7), the term "m" has been incorrectly printed as --in--.

Signed and Sealed this
Thirtieth Day of August, 2011

David J. Kappos
*Director of the United States Patent and Trademark Office*